United States Patent [19]

Garrison

[11] 4,139,203
[45] Feb. 13, 1979

[54] LABYRINTH TYPE ROTARY SEAL WITH INTERMITTENT FEATURE OF CONTACT TYPE SEAL

[75] Inventor: Stephen N. Garrison, Anderson, S.C.

[73] Assignee: Dresser Industries, Inc., Dallas, Tex.

[21] Appl. No.: 790,787

[22] Filed: Apr. 25, 1977

[51] Int. Cl.$^2$ .................. F16J 15/32; F16C 1/24; F16C 33/80
[52] U.S. Cl. ........................ 277/56; 277/82; 277/88; 308/187.2
[58] Field of Search ................ 277/82, 17, 91–93 R, 277/93 SD, 56, 88, 53; 308/187.1, 187.2

[56] References Cited

U.S. PATENT DOCUMENTS

| | | | |
|---|---|---|---|
| 2,132,838 | 10/1938 | Weckstein | 277/56 |
| 2,641,515 | 6/1953 | Bankauf et al. | 308/20 |
| 2,945,730 | 7/1960 | Murray et al. | 308/187.2 |
| 3,350,148 | 10/1967 | Sanguinetti et al. | 308/187.2 |
| 3,552,809 | 1/1971 | Owens | 277/56 X |
| 3,639,016 | 2/1972 | Bourgeois | 308/187.2 |
| 3,858,950 | 1/1975 | Otto | 308/187.1 |

FOREIGN PATENT DOCUMENTS

| | | | |
|---|---|---|---|
| 158040 | 8/1954 | Australia | 308/187.1 |
| 208666 | 4/1960 | Austria | 277/53 |
| 758595 | 3/1953 | Fed. Rep. of Germany | 308/187.1 |
| 1164681 | 5/1958 | France | 308/187.1 |
| 1407288 | 9/1975 | United Kingdom | 277/17 |

Primary Examiner—Robert S. Ward, Jr.
Attorney, Agent, or Firm—John M. Lorenzen; John N. Hazelwood

[57] ABSTRACT

The invention is an improved rotary seal which is particularly well suited for protecting the bearing area in a conveyor idler roll. The seal has inner and outer annular members which normally rotate freely without contact relative to each other. The members have cooperative means to form a labyrinth effective to restrict the ingress of contaminant or the egress of lubricant to or from the bearing area. One of the members further includes an attached annular disc of resilient flexible material. When the lubricant pressure in the bearing area increases, such as when the bearing is being regreased, it forces the free edge of the disc into contact with the other member to form a barrier against the leakage of lubrication. When the lubricant pressure normalizes, the resilient disc recovers to its normal, noncontact position.

17 Claims, 5 Drawing Figures

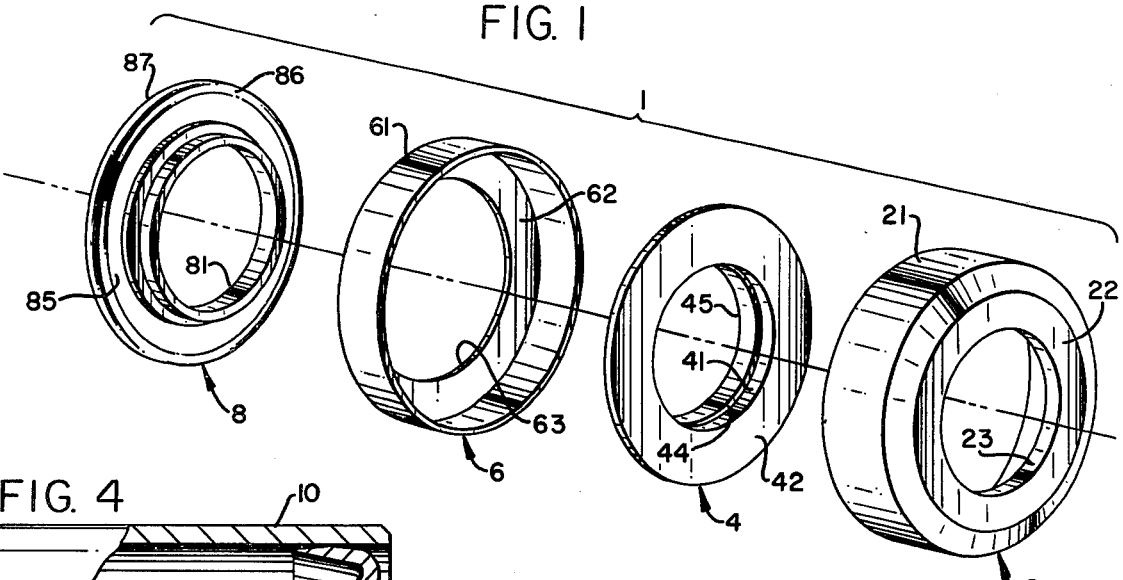
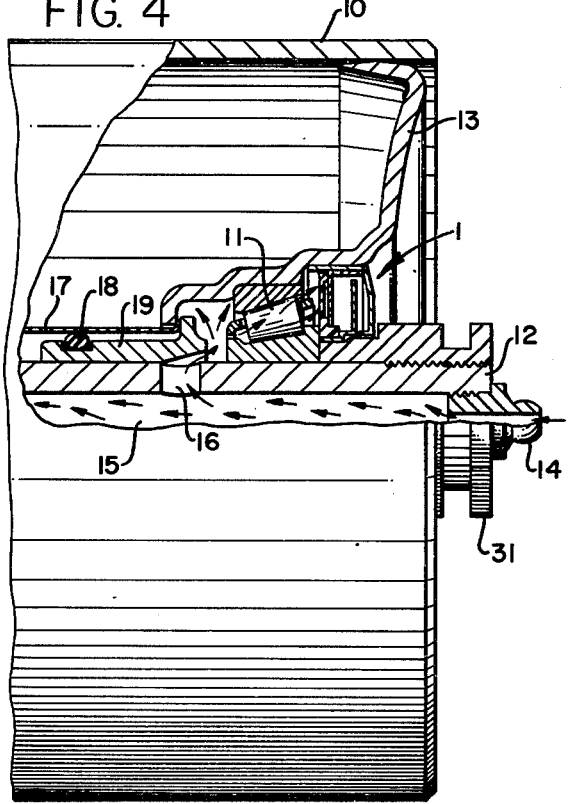
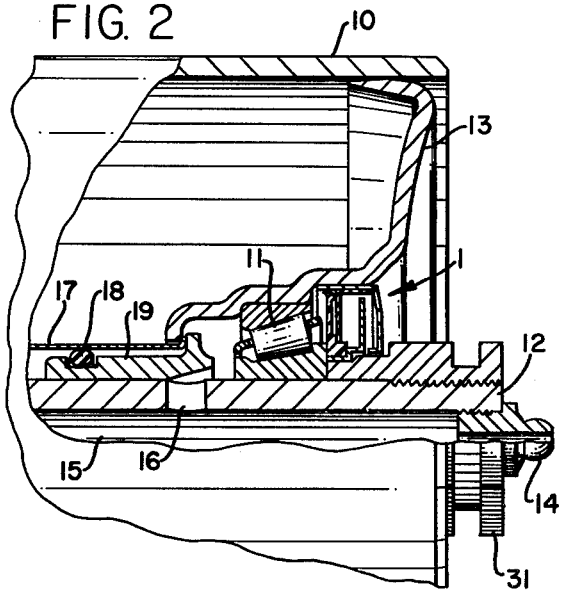
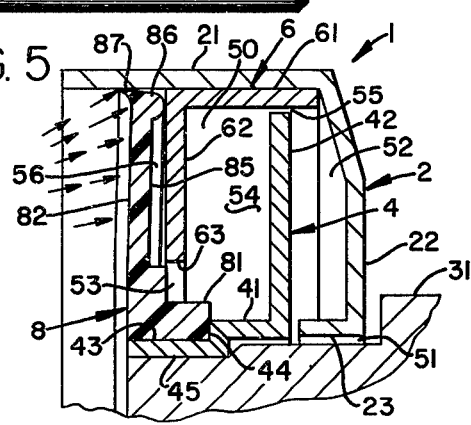
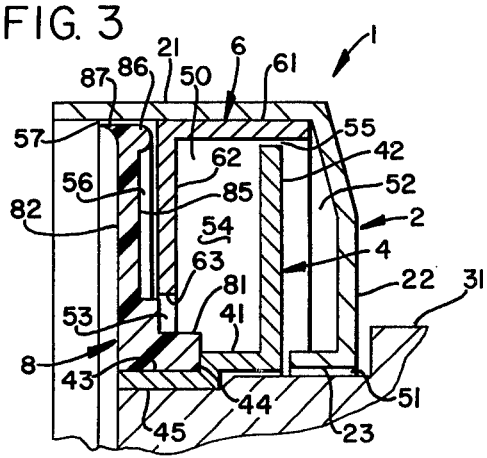

LABYRINTH TYPE ROTARY SEAL WITH INTERMITTENT FEATURE OF CONTACT TYPE SEAL

The invention relates to an improved rotary seal for protecting anti-friction bearings or the like, and more particularly to an improved labyrinth type seal especially suited for use in a conveyor idler roll.

The use of seals in idler rolls to retain lubrication or to prevent the ingress of foreign matter in the bearing area is well known. Generally such seals have been either of the contact or labyrinth type.

In a contact seal there is at least one element in rubbing or sliding contact with either the shaft or the rotating roller. Although this type of seal creates a very good barrier against the ingress of contaminants or the loss of lubrication, both during operation and during the injection of lubrication, the friction caused by the contact element creates additional resistance to rotation. In belt conveyor systems, where a large number of idler rolls are often involved, the cumulative effect of this extra friction of the seals creates a significant additional demand on the drive system and power required to operate the conveyor. For example, because of the added resistance of contact seals, in some cases a much larger drive may be required in order to start a conveyor and to operate it than would be necessary with the use of non-contact type seals. In addition, many of the current state-of-the-art contact seals are of complex and intricate design and therefore expensive. Therefore, contact type seals suffer certain disadvantages for application in conveyor idler rolls.

In a labyrinth seal a network of interlocking passages serve as a maze or tortuous path through which the contaminants or lubricant must find their way. Since the radially opposed elements are designed so as not to contact each other the labyrinth seal has a much lower resistance to rotation than a contact seal. Labyrinth seals are relatively less expensive than contact seals. However, the labyrinth seal is given to leak substantially when the lubricant pressure is increased such as while the adjacent bearing is being regreased. This is an especially serious problem where a plurality of rollers are connected end to end with a common lubrication channel extending through their coaxial shafts. Grease for all the bearings is introduced at one end of the string of rollers and must be under sufficient pressure to push it through to the farthestmost bearing cavity. Thus, it is necessary for the seal adjacent the nearest bearing to be able to withstand the high regreasing pressure.

It is therefore the object of this invention to provide a seal which offers the best features of both contact and labyrinth type seals without their accompanying disadvantages.

More specifically, it is an object of the invention to provide an economical rotary seal which offers a minimal resistance to rotation, but which includes means to prevent the leakage of lubricant during regreasing of the adjacent bearing or the like.

These and other objects are achieved by the present invention in which a labyrinth seal is provided with a flexible but resilient element connected to part of the labyrinth seal such as to allow free rotation during normal operation, but also adapted to deflect into contact with the other part of the labyrinth seal when the pressure against it is increased, such as during the greasing operation, to temporarily form a complete barrier against leakage. When the lubricant pressure is normalized the resilient element recovers to its original shape and position to again allow free rotation of the seal.

In the particular embodiment described below the invention comprises three annular metal stampings and a nylon disc. The stampings are, for convenience only, hereinafter referred to respectively as the outside dust shield, the small labyrinth partition ring, and the large labyrinth partition ring. The dust shield and large ring are designed to join together to form an outer annular member, and are sized to fit snugly in a roller shell, or other rotatable part, and to rotate therewith. The small ring and the nylon disc are designed to be joined to form an inner annular member which is sized to fit snugly on a shaft and remain stationary therewith. The four parts are assembled in interleaving relationship such that their parallel radial walls are spaced apart to form a labyrinth and in such a manner that there is no contact between the parts that rotate and those that do not. Furthermore, the parts are assembled such that one radial wall of the rotating sub-assembly is captured axially between the radial walls of the non-rotating assembly or vice versa such that the overall assembly is self-contained even when not installed.

Under normal operating conditions the dust shield and large ring can rotate freely without contact with the stationary small ring and disc. But the labyrinth formed by the spaced between the parallel radial walls and the annular gaps due to the different diameters is effective to restrain the passage of lubricant or contaminants. However, when the pressure against the nylon disc is increased, such as when an adjacent bearing is being greased, the outer edge of the disc will deflect into contact with the large ring to form a positive barrier against leakage of the lubricant. When the pressure is normalized, the disc recovers to its initial shape and position.

A seal embodying the present invention offers the combined features of minimal resistance to rotation under normal operating conditions, positive retention of lubrication which is being injected under pressure into the sealed area, a self-contained assembly for handling and installation, and a simple design that can be economically manufactured.

Other features and advantages of the invention will appear from the more detailed description which follows with reference to the accompanying drawings which form part of this disclosure, and of which:

FIG. 1 is an exploded isometric view of a rotary seal embodying the present invention;

FIG. 2 shows the end portion of a typical conveyor idler roll partly in section to reveal the application and condition of a rotary seal such as shown in FIG. 1 during normal operating conditions;

FIG. 3 is an enlarged cross-sectional view of just the rotary seal shown in FIG. 2;

FIG. 4 shows the end portion of the same conveyor idler roll as FIG. 2 but in the condition during which lubrication is being injected to the bearing area; and FIG. 5 is an enlarged cross-sectional view of the rotary seal in the condition shown in FIG. 4.

As mentioned before, the drawings show one embodiment of the present invention. FIGS. 2–5 show that embodiment as applied in a typical idler roll such as used to support belt conveyors. However, it should be apparent that the invention has numerous other applications wherever it is desired to seal an annular space between relatively rotating parts.

Referring to the drawings, the seal 1 consists of the outside dust shield 2, the small labyrinth partition ring 4, the larger labyrinth partition ring 6, and the resilient disc 8. The materials from which these parts are made will vary with the requirements of the application. However, by way of example, the dust shield 2 and the labyrinth partition rings 4 and 6 can conveniently be stamped from thin metal. The disc 8 is preferably made of a flexible but resilient and tough material such as nylon.

The outside dust shield 2 comprises an outer cylindrical flange 21, a generally inwardly extending annular wall 22 and a narrower inner cylindrical flange 23 which extends from the wall in the same axial direction as the outer flange 21.

The small partition ring 4 comprises a stepped cylindrical flange 41 and an outwardly extending radial wall 42. The flange 41 has a hub 45 formed by the cylindrical surface 43 and the shoulder 44.

The large partition ring 6 comprises an outer cylindrical flange 61 and an inwardly extending radial wall 62 which terminates at a central opening 63. The outside diameter of the flange 61 is equal to the inside diameter of the flange 21 on the dust shield 2 such that the large ring 6 can be snugly fitted inside the dust shield 2 to form the outer annular member of the seal, as shown in FIGS. 2-5.

The resilient disc 8 has a central rim 81 and an outwardly extending radial wall 82. The inside diameter of the rim 81 is the same as the outside diameter of the hub 45 such that the disc can be snugly fitted to the small ring 4 to form the inner annular member of the seal, as shown in FIGS. 2-5. The wall 82 is provided with an annular groove or relief 85 to increase the flexibility of the outer region of the disc. The disc 8 also includes an annular bead 86 and a flared lip 87 on opposite sides of its peripheral edge for reasons which will be explained later.

The assembled dust shield 2 and large ring 6 are intended to rotate with the roller or other rotating member, and the outside diameter of flange 21 is determined accordingly. Similarly, the inside diameter of the hub 45 of the small ring 4 is sized to fit tightly on a shaft such that the small ring 4 and the disc 8 remain stationary relative to the shaft.

When the rotary seal is assembled the radial wall 42 of the small ring is captured between the radial walls 22 and 62 of the dust shield 2 and large ring 6. The hub 45 extends through the center opening in the wall 62 and the disc is fitted thereon.

The central openings through the flange 23 and the wall 62 are such as to leave annular gaps 51 and 53 between them and the shaft and the outside diameter of the flange 41, respectively. Similarly the outside diameters of the radial walls 42 and 82 are such that they leave gaps 55 and 57 between themselves and the inside diameters of flanges 61 and 21, respectively. However, the wall 82 of the disc 8 must be larger in diameter than the central opening 63 of the ring 6.

The lateral spacing of the two sub-assemblies is determined in the installed position by shoulders on the shaft and the rotatable member but must be such that there is no contact between the flange 23 and the small ring 4 or between the disc 8 and the large ring 6. Thus when properly installed the two members of the seal can rotate freely relative to one another.

Referring now to FIGS. 2 and 3, a typical idler roller in which the invention is advantageously used comprises a cylindrical shell 10 rotatably mounted through anti-friction bearing 11 on a shaft 12. The typical roller has a stamped metal end housing 13 with offset surfaces sized to receive the bearing 11 and the rotary seal 1. Lubrication for the bearing 11, which is usually grease, is introduced through a fitting 14 at one end of the shaft and flows through the hollow passage 15 and opening 16 in the shaft wall to the bearing area as shown by the arrows. To isolate the bearing area from the interior of the roll shell 10 a cylindrical liner 17 extends from one end housing 13 to a similar housing at the opposite end of the roller. The O-ring 18 seated in a groove in collar 19 mounted on the shaft 12 further seals off the bearing area. The passageway 15 in the hollow shaft 12 extends beyond the opening 16 and can carry grease to the bearing area at the opposite end of the roller and, if desired, through suitable connections to the bearings of adjacent end-to-end connected rollers.

The inner race of the bearing 11 is press fit on the shaft 12, and the outer race is pressed into and seated against a shoulder in the end stamping 13. A retainer nut 31 is threadably engaged on the end of the shaft and provides an additional shoulder resting against the inner race of bearing 11. Similarly, the outer member of the seal is axially located by a seat in the end stamping 13, while the inner member is located by a shoulder machined on the retainer nut 31.

Referring now to FIGS. 2 and 3, in the normal operating condition the roller 10 rotates freely about the shaft 12. Since there is no contact between the two members of the seal 1 it offers little or no resistance to such rotation. However, because of the labyrinth 50 formed by the network of gaps 51, 53, 55, and 57, and the parallel spaces 52, 54, and 56 between the radial walls 22, 42, 62, and 82, the bearing lubricant is restrained from escaping and dirt, dust or other contaminants restrained from entering the bearing area.

Notwithstanding the effectiveness of the seals it will usually be necessary to occasionally add lubrication to the bearings of idler rolls. Such relubrication is usually effected by introducing grease through the fitting 14 as explained before, and as illustrated in FIGS. 4 and 5.

The grease or lubrication must be introduced under pressure in order to insure adequate penetration into the parts where it is needed. This of course is especially true where a number of rollers are connected end to end and the lubrication is to be introduced from one end of the assembly.

The rotary seal has the unique ability to alter itself under this condition to form a positive barrier to prevent the loss of lubrication. The increased pressure of the grease will force the outer circumferential edge of the nylon disc 8 to deflect until the bead 86 comes in contact with the wall 62 of the large ring 6.

The flared lip 87 provides two functions. When the seal is in the normal operating condition of FIGS. 2 and 3, the lip serves to deflect any lubricant circulating adjacent the disc away from the gap 57 leading into the labyrinth. On the other hand, during the lubrication stage the lip 87 is forced outward and into contact with the interior of the flange 21. Thus the bead 86 and lip 87 form a double contact barrier with the ring 6.

Once the greasing operation is completed the lubricant pressure will normalize itself by relief back through the fitting 14. When this happens the disc 8, being of a resilient material, will recover to its original shape and condition, as shown in FIG. 3, whereupon the seal again offers no more than a minimum of rotational resistance.

It is also a feature of the seal 1 that it is self-contained after assembly for easy handling and installation. When assembled the radial wall 42 of the inner member is captured between radial walls 22 and 62 of the outer member. However, in the installed condition the relative positioning of the inner and outer annular members is determined by recesses and shoulders on the roller or shaft.

Having described the invention in connection with the embodiment shown in the drawings certain alternative embodiments are readily apparent. For example, the labyrinth portion of the seal may be formed by the combination of a variety of designs for the inner and outer members. Either or both members can be comprised of one or a number of assembled parts, this being a matter largely determined by manufacturing and assembly considerations.

Furthermore, the flexible diaphram for forming a positive seal during the greasing operation can alternatively be affixed to the outer annular member such that its inner peripheral edge will deflect into contact with the inner member. However, affixing the diaphram to the inner member would appear to offer the advantage that for a given thickness the outer region of the diaphram may be more flexible and therefore more responsive to pressure change than its more central region.

Other less apparent variations or modifications to the embodiments shown will appear to those skilled in the art after careful reflection on the foregoing description.

The embodiments of the invention in which an exclusive property or privilege is claimed are defined as follows:

1. A seal for protecting a bearing mounted between a shaft and a concentric rotatable body, comprising:
   an outer ring adapted for engagement by the rotatable body and having at least two inwardly extending but spaced apart annular walls;
   an inner ring adapted for engagement by the shaft and having an annular wall extending outward between the spaced walls of the outer ring, the spaces between said annular walls and the rings forming a continuous labyrinth effective to restrain the passage of lubricant or contaminant through the seal, said outer ring being freely rotatable without touching said inner ring; and
   a resilient annular disc connected to the inner ring and extending radially therefrom in spaced and dimensionally overlapping relation with said outer ring during normal rotation, said disc being sufficiently flexible to deflect under increased lubricant pressure into contact with said outer ring to form a barrier to the passage of lubricant between said rings and sufficiently resilient to recover again to its normal free state when the lubricant pressure is normalized.

2. A seal as recited in claim 1, wherein said outer ring has an annular shoulder proximate to but spaced from the outer perimeter of the disc in its normal condition.

3. A seal as recited in claim 2, wherein said disc has a bead extending around its outer perimeter on the side nearest the outer ring, and wherein when said disc deflects under pressure the bead makes continuous peripheral contact with the shoulder of said outer ring.

4. In a conveyor idler roll mounted on anti-friction bearings for rotation about a shaft, an improved bearing seal comprising:
   an exterior annular dust shield having an outer peripheral flange engaged by and rotatable with the idler roll and an inwardly extending wall terminating at an inner circular opening larger than and concentric with the shaft;
   an interior annular ring frictionally joined to the outer peripheral flange of the dust shield, and a wall extending inward in spaced parallel relation to the wall of the dust shield and terminating in a central circular opening;
   an intermediate annular ring having a central hub fit snugly on the shaft and extending freely through the circular opening in the interior ring, and a wall extending outward from one end of the hub and freely in spaced relation between the walls of the dust shield and interior ring; and
   a resilient disc mounted on the hub of the intermediate ring on the bearing side of the wall of the interior ring and having an annular wall extending outward from the hub in free spaced relation to the wall of the interior ring, said dust shield and interior ring being free to rotate along with the idler roll without touching either the intermediate ring or resilient disc while the spaces between said parts form a continuous labyrinth to restrain the flow of contaminants into or lubrication out of the bearing area, but wherein the disc is sufficiently flexible and resilient that the outer region of the disc will deflect into contact with the interior ring under the influence of increased internal pressure such as occurs when lubrication is added to the bearing area to thereby form a barrier against leakage during such condition but will recover to its normal contact free position when such condition ceases.

5. A rotary seal assembly especially suited for protecting the annular bearing area between a shaft and a body mounted on bearings for rotation about the shaft from unwanted contaminants or loss of bearing lubrication, comprising:
   an inner ring adapted to be fixedly mounted on the shaft and having outwardly extending annular means;
   an outer ring adapted to be mounted in the body for rotation therewith and disposed in the installed condition to rotate freely without contact with either the inner ring or shaft, and having inwardly extending annular means co-operatively arranged with the annular means of the inner ring to form a labyrinth effective to restrict the passage of contaminants or lubrication therethrough during normal rotation of the body; and
   a diaphram connected to one of the rings on the side adjacent the bearing area and having a normally free-standing radial wall in parallel spaced and radially overlapping relation to an annular surface of the other ring, the wall of the diaphram being sufficiently flexible that when the pressure of the lubricant in the bearing area is raised significantly above normal operating pressure its free end will deflect into contact with the annular surface of the other ring to form a barrier to block the flow of lubricant into the labyrinth and sufficiently resilient to return to its normal free-standing position when the lubricant pressure is normalized.

6. A rotary seal as recited in claim 5 wherein the diaphram is attached to the inner ring and the outer annular region of the diaphram is positioned to deflect under the increased lubricant pressure into contact with an annular surface on the outer ring.

7. A rotary seal as recited in claim 6 wherein:
the annular means on the outer ring comprises at least two free-standing, inwardly extending radial walls; and the annular means on the inner ring comprises a free-standing radial wall extending outward in spaced radial overlapping relation between the two walls of the outer ring to form the labyrinth.

8. A rotary seal as recited in claim 7, wherein:
the outer ring has an outer peripheral rim extending laterally toward the bearing area, and wherein the flexible radial wall of the diaphram is positioned within the width of said outer rim, the diameter of the diaphram wall being slightly less than the inside diameter of the outer rim to provide a small annular gap in communication with the labyrinth.

9. A rotary seal as recited in claim 8 wherein the diaphram has an annular bead at the circumferential edge of its radial wall on the side adjacent the outer ring which upon deflection of the diaphram makes uniform peripheral contact with the annular surface on the outer ring.

10. A rotary seal as recited in claim 9 wherein the wall of the diaphram is thinner in an annular region between its center and its outer perimeter such that outer perimeter will deflect substantially farther under pressure.

11. A rotary seal as recited in claim 9 wherein the diaphram has a flared lip adjacent its outer perimeter on the bearing area side of its radial wall to deflect circulating lubricant away from the gap between the diaphram and the rim of the outer ring.

12. A rotary seal as recited in claim 11 wherein the diaphram is positioned in relation to the outer ring such that when it is deflected the bead makes contact with an annular surface of the outer ring and the flared lip makes contact with the rim of the outer ring.

13. A rotary seal as recited in claim 5 wherein the inner and outer rings are rigid metal rings and the diaphram is a thin, flexible, nylon disc.

14. A rotary seal as recited in claim 8 wherein the inner ring has a central hub extending laterally toward the bearing area and the diaphram is mounted on said hub.

15. A rotary seal as recited in claim 5 wherein:
the outer ring comprises two members each having an outer circumferential rim and one of the inwardly extending radial walls and said two members are joined coaxially together after interposition of the outwardly extending wall of the inner ring between their radial walls such that the inner ring is captured within the outer ring even in the uninstalled condition.

16. A rotary seal as recited in claim 15 wherein the inner ring has a central hub extending laterally through the central opening of the radial wall of one of the members of the outer ring, and the diaphram is mounted on said hub such that the radial wall of the one outer ring member is sandwiched between the radial wall of the diaphram and the radial wall of the inner ring.

17. In a labyrinth type rotary seal having an outer ring which rotates freely about an inner ring and said rings form between them a labyrinth to restrain the passage of contaminants or lubricant therethrough, the improvement comprising a flexible diaphram connected to one of the rings and extending radial therefrom to form an annular wall in spaced but radially overlapping relation with the other ring and wherein the diaphram is sufficiently flexible that its outer perimeter will deflect under above normal external pressure into contact with the other ring to temporarily form a contact seal and is sufficiently resilient to return to its free-spaced-apart position when such external pressure is normalized.

* * * * *